Feb. 6, 1968   A. M. FULLERTON ET AL   3,367,464
CENTRIFUGAL CLUTCH
Filed Sept. 13, 1965
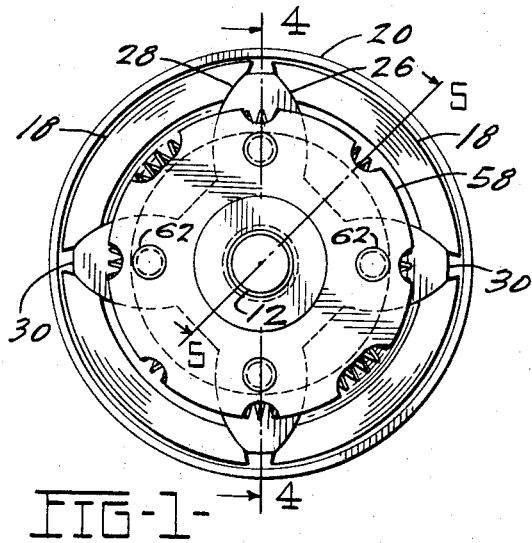
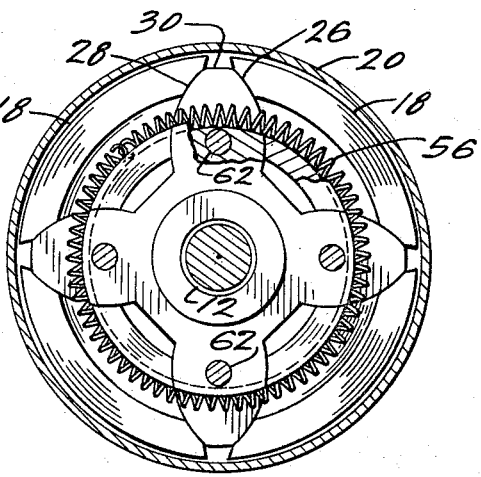
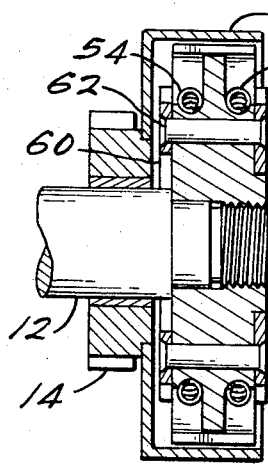
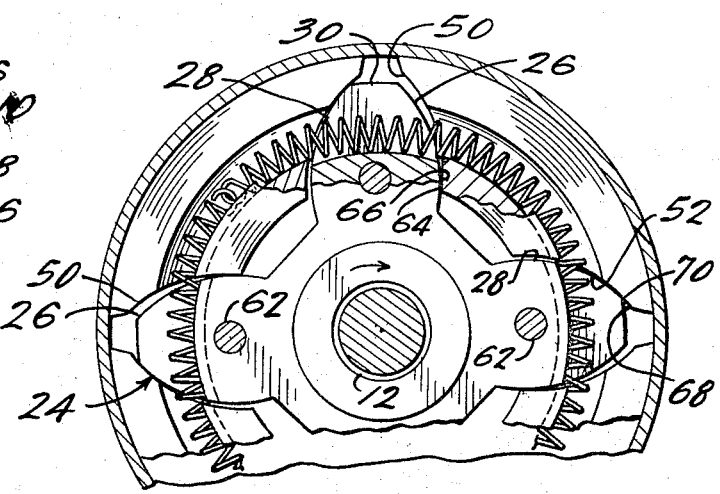
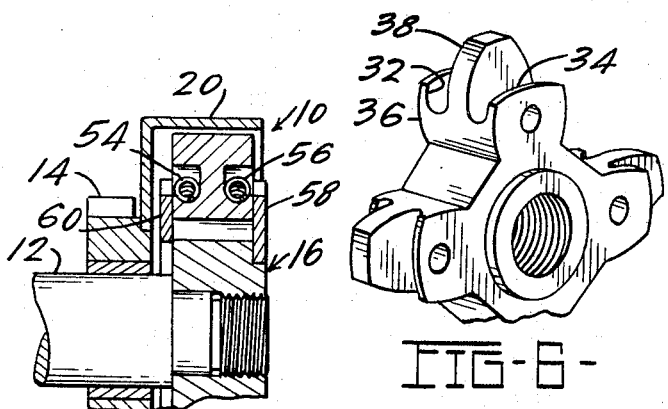
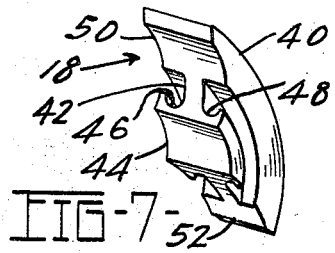
INVENTORS:
A.M. FULLERTON.
H.H. MARTIN.
R.A. RUDNICKI.
BY
ATT'YS.

United States Patent Office 3,367,464
Patented Feb. 6, 1968

3,367,464
CENTRIFUGAL CLUTCH
Arthur M. Fullerton, Herman H. Martin, and Richard A. Rudnicki, Toledo, Ohio, assignors to American-Lincoln Corporation, Toledo, Ohio, a corporation of Ohio
Filed Sept. 13, 1965, Ser. No. 486,832
7 Claims. (Cl. 192—105)

ABSTRACT OF THE DISCLOSURE

A centrifugal clutch is provided with clutch arms and shoes which have engageable surfaces of arcuate configurations such that the shoes engage the driven member of the clutch more smoothly than heretofore. The clutch also has a unique spring arrangement for holding the arms and shoes in an assembled relationship and for enabling the shoes to move outwardly upon rotation of the drive shaft.

---

This invention relates to a centrifugal clutch and more particularly to a centrifugal-actuated friction clutch providing improved operation over the operation of similar clutches heretofore known.

Many types of centrifugal clutches are known in the art and are on the market. It is characteristic of such clutches, when connecting or disconnecting drive and driven members, to tend to engage or disengage in a rapid, abrupt manner. This is undesirable in almost any application in which the clutch is used and is particularly so for chain saws where the jerky operation of the saw chain hampers the control of the operator over the operation of the saw.

The present invention provides a centrifugal clutch with an improved spider and shoe design which enables the clutch to engage and disengage more uniformly and smoothly than heretofore. This design also enables the clutch to be operated equally well in both directions of rotation. The clutch also has improved means for compensating for wear of the shoes so as to provide a greater outward force as the shoes wear and must move further outwardly for engagement. The new clutch also has an improved spring arrangement so that the retention springs employed with the shoes act more uniformly thereon and enable the shoes to contact the clutch drum more uniformly.

It is, therefore, a principal object of the invention to provide an improved centrifugal clutch which engages and disengages more smoothly.

Another object of the invention is to provide a clutch which operates equally well in either direction of rotation.

A further object of the invention is to provide a centrifugal clutch which compensates for wear on the clutch shoes.

Still another object of the invention is to provide a centrifugal clutch utilizing a pair of spaced retention springs to provide more even pressure on the clutch shoes.

Many other objects and advantages of the invention will be apparent from the following detailed description of a preferred embodiment thereof, reference being made to the accompanying drawing, in which:

FIG. 1 is a face view in elevation of a clutch embodying the invention;

FIG. 2 is a view similar to FIG. 1 but with a front retaining plate removed, and with parts broken away and with other parts in section;

FIG. 3 is an enlarged, fragmentary view similar to FIG. 2 but with the clutch shown in a rotating and engaged position;

FIG. 4 is a view in vertical, transverse cross section of the clutch taken on line 4—4 of FIG. 1;

FIG. 5 is a fragmentary view in vertical, transverse cross section taken on line 5—5 of FIG. 1;

FIG. 6 is a fragmentary view in perspective of the clutch spider; and

FIG. 7 is a view in perspective of one of the clutch shoes.

Referring to the drawing, a clutch embodying the invention is indicated at 10 and is used to effect an engagement between a drive shaft 12 and a driven element or sprocket 14 with which a drive chain or saw chain (not shown) is engaged. The basic elements of the clutch 10 include a spider 16 which is suitably mounted on the drive shaft 12, as by a threaded engagement, a plurality of shoes 18, and an engageable drum 20, which is suitably affixed to the sprocket 14, as by welding or brazing.

Referring now in more detail to each clutch component, the spider 16, preferably of sintered steel, includes a central hub 22, and four radially-extending arms 24. Each of the arms 24 is symmetrical about a radial line extending through the axis of the hub 22 or the drive shaft 12 and each includes, assuming clockwise rotation, a forwardly facing surface 26 and a rearwardly facing surface 28 extending from the hub 22 to a blunt end or extremity 30. At least a substantial portion of each of the surfaces 26 and 28 is of a constant radius, with the radius of both surfaces being equal. For proper operation, the radius of the surfaces preferably is from 0.8 to 1.3 times the length of the arms 16. Each of the arms 24 also has arcuate grooves 32 and 34 at an intermediate portion between the hub 22 and the end 30, with the grooves dividing the arm 24 into a thick lower portion 36 and a thinner, central upper portion 38. The thickness of the lower portion 36 is equal to that of the hub 22 while the upper portion 38 is about one-third as thick as the lower portion 36, the upper portion 38 and the grooves 32 and 34 equalling the thickness of the lower portion 36, as best shown in FIG. 6.

Each of the shoes 18, preferably of sintered bronze, includes a heavy drum-engaging rim 40, an intermediate web 42, and an inner flange portion 44. The flange portion 44 forms a pair of arcuate grooves 46 and 48 on each side of the web 42 with all eight of the arcuate grooves on each side of the webs and arms forming a continuous annular groove. The rim 40 and the flange portion 44 are substantially as thick as the hub 22 while the web 42 is approximately as thick as the upper portion 38 of the arm 24.

The combined rim, web, and flange portion of each of the shoes 18 form continuous surfaces 50 and 52 which are contiguous with the surfaces 26 and 28 when the clutch is at rest or idling. The surfaces 50 and 52 have the same radius as the surfaces 26 and 28 and have the same centers of curvature when the shoes and arms are in the contiguous positions. The surfaces 50 and 52, however, do not extend inwardly as far as the surfaces 26 and 28 so that there is a space between the hub 22 and the flange portions 44 when the shoe fully contacts the arms, as shown in FIG. 2. The end of the rim 40 outwardly of the surfaces 50 and 52 are cut off so that the shoes are always spaced apart.

Garter springs 54 and 56 are located in the annular grooves with the spring 54 being located in the grooves 32 and 46 of the arms 24 and the shoes 18 while the spring 56 is located in the grooves 34 and 48 of the arms and shoes. By employing two of the springs 54 and 56 the shoes 18 are always urged inwardly uniformly and do not have a tendency to cock as can otherwise occur with only one spring employed.

Retainer plates 58 and 60 are located adjacent the spider 16 and extend upwardly beyond the grooves 32, 34, and 46, 48 to guide the springs and retain them during operation of the clutch. The retainer plates 58 and 60 can be fastened to one another through the spider by suitable rivet pins 62 or other fasteners.

In the operation of the clutch 10, assuming the drive shaft 12 rotates in a clockwise direction as shown in FIG. 3, as the shaft 12 is driven, the spider 16 rotates therewith, along with the shoes 18 carried between the arms 24. At rest and at idle speed, the shoes 18 are clear of the drum 20, being held with the surfaces 50 and 52 against the surfaces 26 and 28 of the arms by means of the garter springs 54 and 56. When the shaft 12 rotates faster than the idle speed, the centrifugal force acting on the relatively heavy shoes 18 overcomes the force of the springs 54 and 56 and moves the shoes outwardly until they frictionally engage the drum 20. At this time, the drum 20 and the sprocket 14 begin to rotate with the shaft 12. When the shoes engage the drum, they move rearwardly with the surfaces 50 bearing on the surfaces 26 of the arms or, more accurately, a lower corner portion 64 of the surface 50 bearing on an intermediate portion 66 of the surface 26. At the same time, an upper corner portion 68 of the front shoe surface 52 engages an upper corner portion 70 of the arm surface 28. This cooperation of the curving shoe and arm surfaces enables the shoes 18 to move into and out of engagement with the drum 20 much more smoothly than possible with clutches heretofore known. The smooth operation is desired for substantially any clutch application and is particularly desirable for chain saws where the smoother starting and stopping of the saw chain enables the operator to maintain more effective and safer control over operation of the saw.

The clutch 10 operates equally well in either direction with the particular design of the arms and shoes. This, of course, is advantageous in many applications and, in the case of chain saws, enables the saw chain to be driven through a gear train, where extra power is desired, in which case the clutch might have to be driven in the opposite direction to obtain the desired movement of the saw chain through the gear train.

In a specific application of the clutch, the drive shaft 12 is designed to idle at 2800–3000 r.p.m. When the speed of the shaft reaches 3600 r.p.m., the shoes begin to engage the drum and drive the saw chain or other device slowly. The clutch then remains in engagement at higher speeds, disengaging when the speed of the drive shaft subsequently decreases to approximately 5400 r.p.m. under load.

In practice, the shoes 18, when the centrifugal force overcomes the spring force, move out only approximately twenty-five to thirty-thousandths inch until the drum is engaged. As the shoes wear, however, they must move outwardly farther before the drum is engaged; this requires more force because the springs 54 and 56 are stretched more. At the same time, the mass of the shoes is somewhat decreased, thereby decreasing the centrifugal force. Consequently, the drive shaft must rotate at a higher speed before driving engagement of the drive shaft and drum is achieved. With the particular surface 26, 28, and 50, 52, however, the above effect is compensated for. As shown in FIG. 3, as the shoes wear and move outwardly, the point 64 of the surface 50 engages the surface 26 farther out so that an increased camming effect is obtained between the shoes and arms. The arms thereby tend to urge the shoes outwardly with more force as wear occurs with this force overcoming the lesser weight of the shoes and the greater spring tension.

Various modifications of the above described embodiment of the invention will be apparent to those skilled in the art, and it is to be understood that such modifications can be made without departing from the scope of the invention, if they are within the spirit and the tenor of the accompanying claims.

We claim:

1. A centrifugal clutch comprising a spider having a hub with means for engaging a drive shaft, said spider having a plurality of arms extending radially therefrom, each of said arms being symmetrical about a radial line extending centrally therethrough, said arms having opposed cam surfaces of generally uniform radius extending from said hub to outer extremities of said arms, a plurality of clutch shoes having outer rims for engaging a clutch drum and having inwardly extending webs, said shoes having surfaces of configuration similar to said arm surfaces, the radii of said arm cam surfaces and said shoe surfaces being from 0.8 to 1.3 times the length of said arms, and means engageable with said arms and said webs for urging said shoes inwardly against said arms.

2. A centrifugal clutch for chain saws or the like comprising a spider having a hub with means for threadedly engaging a drive shaft, said spider having four arms extending radially therefrom, each of said arms being symmetrical about a radial line extending centrally therethrough, said arms having opposed cam surfaces of generally uniform radius throughout most of their lineal extents and tapering from relatively broad bases adjacent the hub to relatively narrow ends, said spider having arcuate grooves on each side of said arms at intermediate points between the bases and the ends, the thickness of said hub being substantially at least as much as the combined thickness of said arms and the groove portions on each side thereof, four clutch shoes having arcuate rims substantially as thick as said hub with central radially inwardly extending webs substantially as thick as said arms, and flange portions at the inner ends of said webs substantially as thick as said hub, said flange portions having arcuate grooves of the same radius as said arm grooves and extending substantially between said arm grooves whereby said arm grooves and said flange grooves form two substantially complete annular grooves, one on each side of said arms and said webs, when said shoes engage said arms, said shoes having cam configurations similar to those of said arms and with the same radius, garter springs in said annular grooves urging said shoes into engagement with said arms with the innermost portions of said flange portions spaced from said hub, and a retainer plate affixed to said spider on each side thereof and extending outwardly beyond said annular grooves to provide a guide and retainer for said garter springs.

3. A centrifugal clutch for chain saws or the like comprising a spider having a hub and means for engaging a drive shaft, said spider having a plurality of arms extending radially therefrom, each of said arms being symmetrical about a radial line extending centrally therethrough, said arms having opposed curved surfaces throughout most of their lineal extents and tapering from relatively broad bases adjacent the hub to relatively narrow ends, said spider having arcuate grooves on each side of said arms at intermediate points between the bases and the ends, a plurality of clutch shoes having arcuate rims with central radially inwardly extending webs, and flange portions at the inner ends of said webs, said flange portions having arcuate grooves of the same radius as said grooves of said arms and extending substantially between said arm grooves whereby said arm grooves and said flange grooves form two annular grooves, one on each side of said arms and said webs, when said shoes engage said arms, said shoes having cam configurations similar to those of said arms with the same radius, garter springs in said annular grooves urging said shoes into engagement with said arms with said flange portions spaced from said hub, and a retainer plate affixed to said spider on each side thereof and extending outwardly beyond said annular grooves to provide a guide and retainer for said springs.

4. A centrifugal clutch for chain saws or the like comprising a spider having a hub and means for engaging a drive shaft, said spider having a plurality of arms extending outwardly therefrom, each of said arms having a forwardly-facing cam surface of generally constant radius throughout the lineal extent from a relatively broad base adjacent the hub to a relatively narrow end, said spider having arcuate grooves in each side of said arms at intermediate points between the bases and the ends, a plurality of clutch shoes having arcuate rims with radially-inwardly extending webs, and flange portions at the inner ends of said webs, said flange portions having arcuate grooves of the same radius as said arm grooves and extending substantially between said arm grooves whereby said arm grooves and said flange grooves form two annular grooves, one on each side of said arms and said webs, when said shoes engage said arms, said shoes having surface configuration similar to those of said arms and with the same radius, garter springs in said annular grooves urging said shoes into engagement with said arms, and a retainer plate affixed to said spider on each side thereof and extending outwardly beyond said annular grooves to provide a guide and retainer for said springs.

5. A centrifugal clutch for chain saws or the like comprising a spider having a hub and means for engaging a drive shaft, said spider having a plurality of arms extending outwardly therefrom, each of said arms having a forwardly-facing curved surface extending from a relatively broad base adjacent the hub to a relatively narrow end, said spider having arcuate grooves on said arms, a plurality of clutch shoes having arcuate rims with radially-inwardly extending webs, and flange portions at the inner ends of said webs, said flange portions having arcuate grooves of the same radius as said spider grooves and extending substantially between said spider grooves to form an annular groove around said hub on said arms and said webs, when said shoes engage said arms, said shoes having surface configurations similar to those of said arms, said arm surfaces and said shoe configurations having substantially equal radii which are between 0.8 and 1.3 times the length of said arms, and a spring in said annular groove urging said shoes into engagement with said arms.

6. A centrifugal clutch for chain saws or the like comprising a spider having a hub and means for engaging a drive shaft, said spider having a plurality of arms extending outwardly therefrom, each of said arms having a forwardly-facing cam surface of generally constant radius throughout its lineal extent from a relatively broad base adjacent the hub to a relatively narrow end, said spider having arcuate grooves in each side of said arms at intermediate points between the bases and the ends, a plurality of clutch shoes having arcuate rims with radially inwardly extending webs, and flange portions at the inner ends of said webs, said flange portions having arcuate grooves of the same radius as said arm grooves and extending substantially between said arm grooves whereby said arm grooves and said flange grooves form two annular grooves, one on each side of said arms and said webs, when said shoes engage said arms, said shoes having surface configurations similar to those of said arms and with the same radius, and garter springs in said annular grooves urging said shoes into engagement with said arms.

7. A centrifugal clutch for chain saws or the like comprising a spider having a hub and means for engaging a drive shaft, said spider having a plurality of arms extending radially therefrom, each of said arms being symmetrical about a radial line extending centrally therethrough, said arms having opposed curved surfaces throughout most of their lineal extents and tapering from relatively broad bases adjacent the hub to relatively narrow ends, said arms having arcuate grooves at intermediate points between the bases and the ends, a plurality of clutch shoes having arcuate rims with centrally radially inwardly extending webs, and flange portions at the inner ends of said webs, said flange portions having arcuate grooves of the same radius as said grooves of said arms and extending substantially between said arm grooves whereby said arm grooves and said flange grooves form an annular groove when said shoes engage said arms, said shoes having cam configurations similar to those of said arms with the same radius, a garter spring in said annular groove urging said shoes into engagement with said arms with said flange portions spaced from said hub, and means adjacent said annular groove to retain said garter spring in said annular groove.

References Cited

UNITED STATES PATENTS

| | | | |
|---|---|---|---|
| 1,983,661 | 12/1934 | Frantz et al. | 192—105 |
| 1,985,934 | 1/1935 | Logan | 192—105 X |
| 2,504,177 | 4/1950 | Bruestle | 192—105 |

FOREIGN PATENTS

| | | |
|---|---|---|
| 208,863 | 1/1924 | Great Britain. |
| 245,323 | 1/1926 | Great Britain. |

BENJAMIN W. WYCHE III, *Primary Examiner.*